US011895263B2

(12) United States Patent
Tadesse et al.

(10) Patent No.: US 11,895,263 B2
(45) Date of Patent: Feb. 6, 2024

(54) INTERPRETING CONFERENCE CALL INTERRUPTIONS

(71) Applicant: INTERNATIONAL BUSINESS MACHINES CORPORATION, Armonk, NY (US)

(72) Inventors: Girmaw Abebe Tadesse, Nairobi (KE); Michael S. Gordon, Yorktown Heights, NY (US); Komminist Weldemariam, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 17/329,730

(22) Filed: May 25, 2021

(65) Prior Publication Data
US 2022/0385758 A1    Dec. 1, 2022

(51) Int. Cl.
| | | |
|---|---|---|
| *H04M 3/22* | (2006.01) | |
| *H04N 7/15* | (2006.01) | |
| *H04M 3/56* | (2006.01) | |
| *G10L 15/26* | (2006.01) | |
| *G10L 25/51* | (2013.01) | |
| *G10L 15/30* | (2013.01) | |
| *G10L 15/22* | (2006.01) | |

(52) U.S. Cl.
CPC ............ *H04M 3/22* (2013.01); *G10L 15/26* (2013.01); *G10L 25/51* (2013.01); *H04M 3/568* (2013.01); *H04N 7/15* (2013.01); *G10L 15/22* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 7,617,280 B1 | 11/2009 | Webster | |
| 8,234,289 B2 * | 7/2012 | Abernethy, Jr. | ....... G06Q 10/10 707/758 |
| 8,300,790 B2 | 10/2012 | Buford | |
| 8,605,881 B2 | 12/2013 | Buzdugan | |
| 8,654,954 B2 | 2/2014 | Gaudin | |
| 9,774,746 B1 | 9/2017 | Sennett | |
| 9,813,560 B2 | 11/2017 | Vendrow | |
| 10,057,426 B2 | 8/2018 | Waugh | |

(Continued)

OTHER PUBLICATIONS

Authors Unknown, "A Process or System for Batch Transcription of Recorded Voice Conferences," IP.com No. IPCOM000154188D, IP.com Publication Date: Jun. 21, 2007, 3 pages.

(Continued)

*Primary Examiner* — Quoc D Tran
(74) *Attorney, Agent, or Firm* — Rakesh Roy (57) ABSTRACT

A method, computer system, and a computer program product for interpreting conference call interruptions is provided. The present invention may include analyzing a conference call including at least two participants. The present invention may also include identifying at least one interrupted segment in the analyzed conference call. The present invention may further include reconstructing the identified at least one interrupted segment of the analyzed conference call and integrating it with the uninterrupted (heard) portion of the conference call.

20 Claims, 7 Drawing Sheets

(56) References Cited

U.S. PATENT DOCUMENTS

| | | | |
|---|---|---|---|
| 10,116,801 B1 | 10/2018 | Christiano | |
| 10,742,817 B1 | 8/2020 | White | |
| 2005/0018826 A1 | 1/2005 | Benco | |
| 2008/0095348 A1* | 4/2008 | Abernethy | H04M 3/42221 379/202.01 |
| 2009/0220064 A1 | 9/2009 | Gorti | |
| 2010/0198594 A1* | 8/2010 | Gangemi | G10L 13/00 704/235 |
| 2015/0195411 A1* | 7/2015 | Krack | H04M 3/569 379/202.01 |
| 2019/0215542 A1* | 7/2019 | Gandhi | H04N 21/8547 |
| 2020/0279570 A1* | 9/2020 | Nakayama | G10L 17/26 |
| 2021/0075906 A1* | 3/2021 | Walton | H04M 3/2281 |
| 2022/0246133 A1* | 8/2022 | Olivieri | H04N 7/147 |

OTHER PUBLICATIONS

Beauford, "Cisco Webex Hosted 20 Billion Meeting Minutes in April," uctoday.com, May 11, 2020, [accessed Dec. 14, 2020], Retrieved from the Internet: <https://www.uctoday.com/collaboration/cisco-webex-hosted-20-billion-meeting-minutes-in-april/>, 6 pages.

Disclosed Anonymously, "A more intelligent solution for resolving speech conflicts in a conference call," IP.com No. IPCOM000241762D, IP.com Publication Date: May 29, 2015, 3 pages.

Disclosed Anonymously, "Method and apparatus to improve the clarity of multiple simultaneous speakers in a conference call," IP.com No. IPCOM000225333D, IP Publication Date: Feb. 11, 2013, 4 pages.

Disclosed Anonymously, "Method and System for Predicting the Speaker's Spoken Timeline During Any Multi-Party Conference Call," IP.com No. IPCOM000263887D, IP.com Publication Date: Oct. 16, 2020, 5 pages.

Iqbal, "Zoom Revenue and Usage Statistics (2020)," Business of Apps.com, Oct. 30, 2020, [accessed Dec. 14, 2020], Retrieved from the Internet: <https://www.businessofapps.com/data/zoom-statistics/>, 9 pages.

rev.com, "How to Transcribe Zoom Recordings, Meetings, and Call Audio & Video," Blog, [accessed Dec. 14, 2020], Retrieved from the Internet: <https://www.rev.com/blog/resources/how-to-transcribe-zoom-audio-recordings-meetings-and-calls>, 14 pages.

Taylor, "How To Deal with Conference Call Interruptions," FreeConference.com, Nov. 14, 2017, [accessed Dec. 14, 2020], Retrieved from the Internet: <https://www.freeconference.com/blog/conference-call-interruptions/>, 4 pages.

Mell et al., "The NIST Definition of Cloud Computing", Recommendations of the National Institute of Standards and Technology, NIST Special Publication 800-145, Sep. 2011, 7 pages.

\* cited by examiner

INTERPRETING CONFERENCE CALL INTERRUPTIONS

BACKGROUND

The present invention relates generally to the field of computing, and more particularly to audio and/or video-based conference calls.

The use of audio and/or video-based conference calling has become more prevalent as more people work from home, attend classes remotely, and organize virtual celebrations. One major problem with existing conference calling technologies is the issue of two or more participants speaking at the same time and unintentionally interrupting each other. These types of interruptions occur less often during face-to-face meetings as attendees can see when a person is speaking and process the visually observed signals to determine when the speaker is about to pause or take a break from speaking. During conference calls, unintentional interruptions may break the continuity of a meeting or prevent important subjects from being discussed.

SUMMARY

Embodiments of the present invention disclose a method, computer system, and a computer program product for interpreting conference call interruptions. The present invention may include analyzing a conference call including at least two participants. The present invention may also include identifying at least one interrupted segment in the analyzed conference call. The present invention may further include reconstructing the identified at least one interrupted segment of the analyzed conference call and integrating it with the uninterrupted (e.g., heard) portion of the conference call.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for interpreting an interrupted portion of a conference call. As such, the present embodiment has the capacity to improve the technical field of computerized real-time conversations by preserving the content and intent of conversations between two or more people when people speak at the same time in audio and/or video-based conference calls. More specifically, a conference program may analyze a computerized version of a real-time and/or past conversation between multiple participants. Then, the conference program may identify or predict an interruption for one or more participants of the call. Next, the conference program may reconstruct the interrupted (unheard) portion of the call for each participant.

As described previously, the use of audio and/or video-based conference calling has become more prevalent as more people work from home, attend classes remotely, and organize virtual celebrations. One major problem with existing conference calling technologies is the issue of two or more participants speaking at the same time and unintentionally interrupting each other. These types of interruptions occur less often during face-to-face meetings as attendees can see when a person is speaking and process the visually observed signals to determine when the speaker is about to pause or take a break from speaking. During conference calls, unintentional interruptions may break the continuity of a meeting or prevent important subjects from being discussed. When an interruption occurs, audio input from the loudest participant may be heard in the conference call, whereas the audio input from another participant may go unheard. In other instances, an unheard portion of the conference call may be due to, for example, the occurrence of a car horn if one participant is talking while walking in traffic and not due to an interruption by another participant.

Another problem with existing conference calling technologies is the issue of participants trying to speak during a conversation and being unable to do so because there may not be any clear breaks in the flow of the conversation.

Therefore, it may be advantageous to, among other things, provide a way to prioritize certain speakers to ensure that the important topics of a meeting are discussed during the conference call. It may further be advantageous to analyze on-going calls/conversations to detect interruptions. It may further be advantageous to predict future interruptions, using a machine learning model trained based on analyzing historical call/conversation logs, and intervening accordingly. By way of an example, an intervention may include sending an alert to a user of the likelihood of an interruption to happen in five minutes from now and presenting to the user an option to prevent it depending on the importance of the user speaking context. It may also be advantageous to identify the speaking pattern of participants (e.g., audio signal analysis) so that other participants may be less likely to unconsciously interrupt the speaker. It may further be advantageous to identify participants with low engagement levels and encourage them to participate in the conference call. It may also be advantageous to identify non-verbal cue signals and use the signals to mimic face-to-face meetings for call interruption detection. It may be advantageous to take into account a history of one or more participants interrupting in previous conference calls. It may also be advantageous to transcribe the contents of a conference call by utilizing both heard and unheard audio streams from all the participants, content from the meeting chat room, and graphical contents shared during the meeting. It may further be advantageous to cluster the participants based on the content they shared to provide semantically coherent transcription. It may further be advantageous to augment the recording from the meeting with unheard comments from the participants (e.g., because they were interrupted by another participant or environmental noise) and chat room content.

According to at least one embodiment, a conference program of the present disclosure may be configured as an opt-in service with computing devices or communication devices. In one embodiment, the conference program may be automatically triggered and run in the background when a conference call is detected among two or more participants. In some embodiments, the conference program may be triggered based on an individual profile, based on understanding participant relationships, and/or based on user-specified rules.

According to at least one embodiment, the conference program may monitor, in a privacy-preserving manner, the conversation between the participants on their devices, analyze, detect or estimate the degree of the interruption in a call or conversation based on the analysis of the conversation and conversation interruption data. The conference program may further identify participants with low engagement levels and encourage them to interact (e.g., participant might have been waiting for a chance to speak).

According to at least one embodiment, the conference program may receive and analyze miscellaneous data sources (e.g., call conversation interruption data) including historical behavioral data, conversations and call contextual data (e.g., business conference call, education event, meet-up, family event, informal call), profiles, chat conversations, graphic presentations, data from sensors of mobile devices, including historical interactions of a first entity with other entities, history of interruption data, historical communication means, geo-location, and/or historical calendar data. The conference program may time-stamp audio streams and chat activities and map those activities with the corresponding participant(s). The conference program may also receive and analyze data from an electronic calendar, for example, meeting topic, agenda, prior topics discussed, durations, and other appointments. The conversation interruption data may be stored locally (e.g., on the user device or communication network) or on remotely hosted databases (e.g., on the cloud).

According to at least one embodiment, the conference program may align audio streams that were heard by all of the participants and audio streams that were collected from all the participants (e.g., some segments may not have been heard across the conference call). In one embodiment, the conference program may transcribe the aligned full (e.g., heard and unheard) audio streams. In one example, the unheard audio stream includes the spoken material from the participant that was interrupted by a louder speaker. In at least one embodiment, the conference program may augment the full transcriptions with aligned and mapped chat activities and graphical contents from the meeting.

In a written transcript of a conference call (e.g., teleconference meeting, videoconference), the conversation, as heard, may be transcribed and may be annotated by the name of the speaker. In at least one embodiment, the unheard portion of the conversation (e.g., that spoken by the person who was either interrupted or that which was spoken but could not be added into the conversation) may be added to the written transcript and may be annotated by an identifier associated with the speaker. The conference call participants may benefit from reading a time-stamped and contextualized transcript from this full conversation as it may contain content which may not have been heard but spoken by one or more of the participants during the meeting.

In conference call meetings with a substantial number of participants, a meeting chat room may provide a parallel platform to share content among the participants. This content may include questions being asked and answered, and sharing of related links for further references. Thus, one embodiment of the conference program may analyze and cluster chatroom activities by participants, timestamp these activities, and merge this content with the heard and unheard portions of the conference call meeting into a full transcript (e.g., a recorded conference call content). In one embodiment, the quality of the full transcript may be enhanced by integrating with the heard and unheard portions and analysis of the chatroom/discussion activities.

In one embodiment, the enhanced recorded content may be (re)distributed to the invitees of the conference call, including those who did not attend the original call. Those that listen to the recording may hear a direct facsimile of what was heard by the participants. According to one embodiment, the conference program may record the audio input of each participant even if their voices do not get heard by the others (e.g., they were interrupted). Later, the recorded audio from each participant may be combined and the contribution from each speaker may be identified and annotated by the conference program into a full recording of the conference call.

According to one embodiment, in addition to the written transcription, the recording of a conference call may also be augmented with various contents from an associated chat room (e.g., questions asked/answered, comments, web links).

In one embodiment, the conference program may augment the transcribed text and the recording, by automatically updating the interrupted segments of the recording for each participant that was interrupted. In a further embodiment, the conference program may notify the interrupter via a graphical user interface ("GUI") of a teleconferencing platform with content that indicates that they may have interrupted the conversation/conference call. Similarly, in another embodiment, the conference program may notify the participant that was interrupted so that they know their spoken content may not have been heard.

Figure 1:
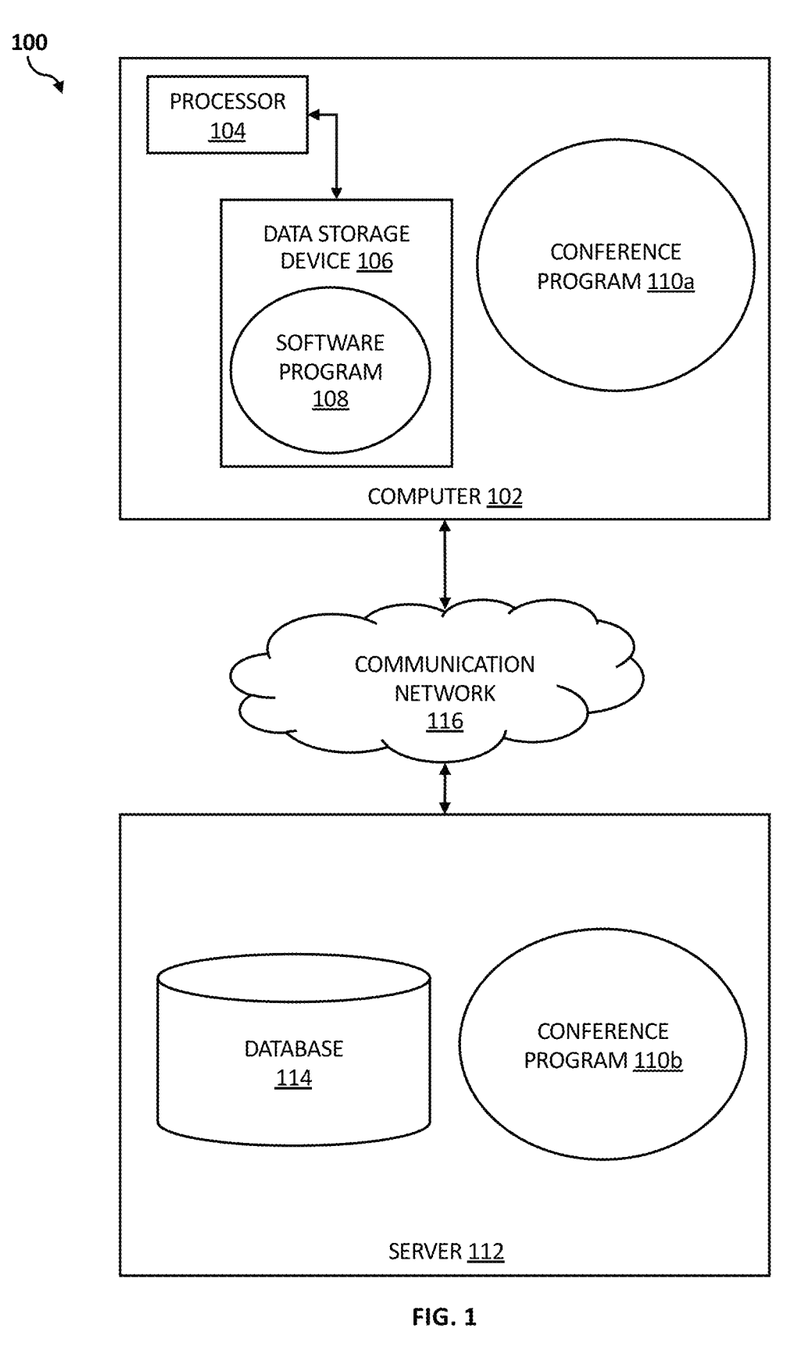
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a conference program 110a. The networked computer environment 100 may also include a server 112 that is enabled to run a conference program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the conference program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the conference program 110a, 110b (respectively) to preserve the content and intent of conversations between two or more participants when they speak at the same time in an audio and/or video-based conference call and reconstruct any interrupted (e.g., unheard) segment of the conference call for each interrupted participant. Embodiments of the present disclosure are explained in more detail below with respect to FIGS. 2 to 4.

Figure 2:
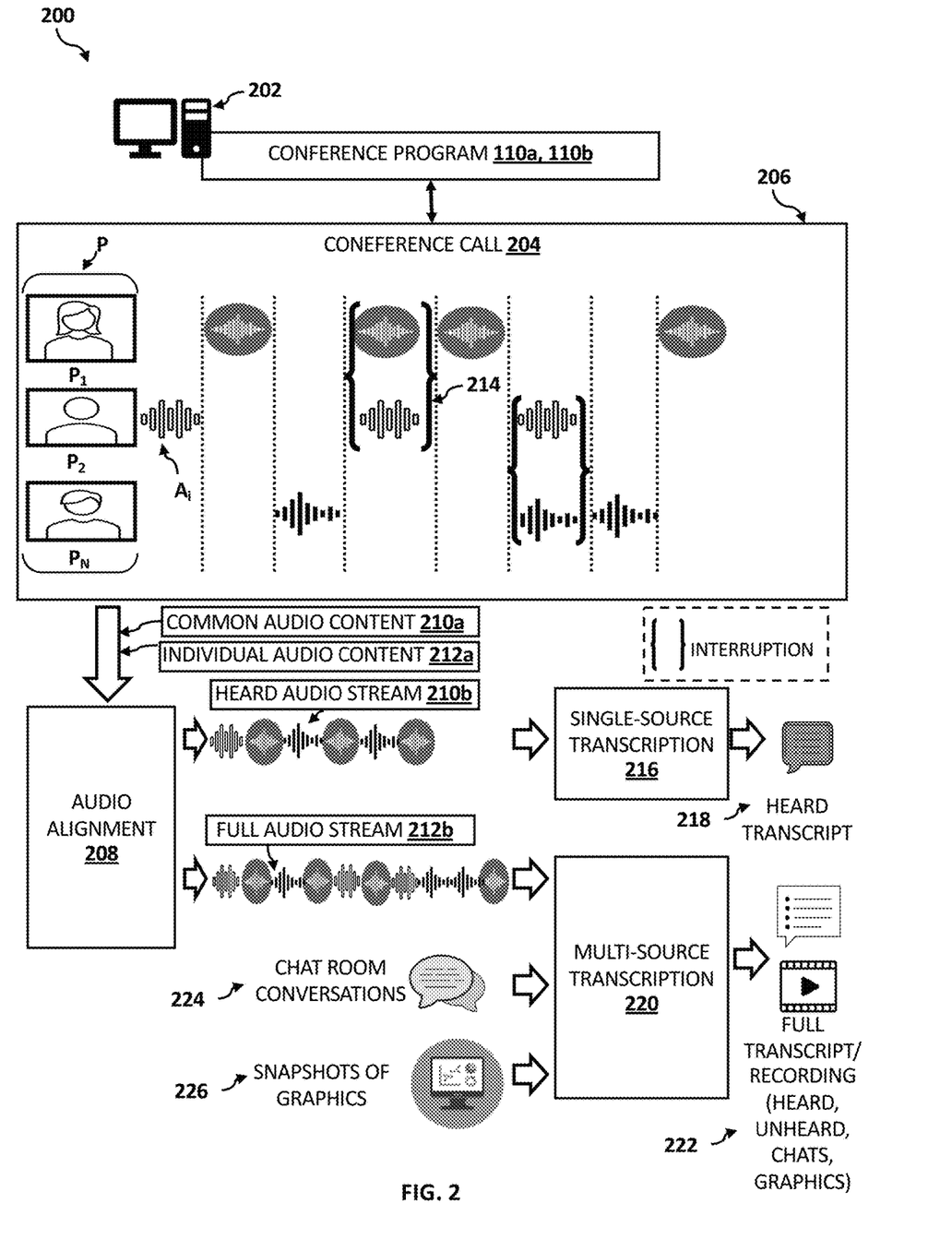
FIG. 2 is a schematic block diagram of a virtual meeting environment according to at least one embodiment.

Referring now to FIG. 2, a schematic block diagram of a virtual meeting environment 200 implementing the conference program 110a, 110b according to at least one embodiment is depicted. According to one embodiment, the virtual meeting environment 200 may include one or more components (e.g., client computer 102; server computer 112; communication network 116) of the computer environment 100 discussed above with reference to FIG. 1.

According to one embodiment, the virtual meeting environment 200 may include a computer system 202 having a tangible storage device and a processor that is enabled to run the conference program 110a, 110b. In one embodiment, the computer system 202 may include one or more client computers 102 and/or one or more server computers 112. In various embodiments, the client computer 102 and/or the server computer 112 of the computer system 202 may include a workstation, a personal computing device, a laptop computer, a desktop computer, a thin-client terminal, a tablet computer, a smart telephone, a smart watch or other smart wearable, or other electronic devices.

According to one embodiment, a user may interact with the conference program 110a, 110b running on computer system 202 to initiate or join a conference call 204 including a set of participants (P). In one embodiment, as shown in FIG. 2, the set of participants P may include participant $P_1$, participant $P_2$, and participant $P_N$, where N may indicate the total number of participants. Each participant $P_i$ (e.g., $P_1$-$P_N$) may interact with a computing device (e.g., client computer 102) of computer system 202 to join the conference call 204. In one embodiment, the user may include one or more meeting hosts or meeting leaders associated with conference call 204. In some embodiments, the user may be part of the set of participants P.

In one embodiment, the conference call 204 may include any computerized version of a real-time conversation/discussion between the set of participants P. In various embodiments, the conference call 204 may enable video, audio, chat, and/or text messaging for real-time communication between the set of participants P. Throughout the present disclosure, conference call 204 may be referred to interchangeably as a teleconference, a video conference, or a virtual meeting. In one embodiment, the conference program 110a, 110b may support real-time audio, video, and data streaming between the set of participants P logged into a virtual meeting room 206.

According to one embodiment, the conference program 110a, 110b may record the audio stream as heard in the conference call 204 by the set of participants P (e.g., common audio content 210a). In addition, the conference program 110a, 110b may also collect respective audio streams $A_i$ captured by the computing devices of each participant $P_i$ (e.g., individual audio content 212a).

According to one embodiment, the conference program 110a, 110b may implement an audio alignment process 208 on the common audio content 210a and the individual audio content 212a. In one embodiment, the audio alignment process 208 may sequence the common audio content 210a based on a time-stamp for each speech segment (e.g., start and end instances) and output a heard audio stream 210b. In at least one embodiment, the audio alignment process 208 may sequence the individual audio content 212a based on the time-stamp for each speech segment (e.g., start and end instances) and output a full audio stream 212b. In one embodiment, the full audio stream 212b may be longer than the heard audio stream 210b as the full audio stream 212b may include respective audio streams $A_i$ captured by the computing devices of a participant $P_i$ but not heard by all of the participants P of the conference call 204.

In one embodiment, the conference program 110a, 110b may compare the heard audio stream 210b and the full audio stream 212b to determine one or more differences in the audio content. In one embodiment, the conference program 110a, 110b may identify any differences in the audio content as unique contributions from the respective participant $P_i$ which may not have been heard by the full set of participants P. In one embodiment, the conference program 110a, 110b may determine that the unheard audio content may have been unheard by the other participants due to an interruption 214 (e.g., participant $P_1$ and participant $P_2$ speaking at the same time) in the conference call 204 where only the content of speech from the louder participant $P_1$ or $P_2$ was heard.

According to one embodiment, the conference program 110a, 110b may implement a single-source transcription process 216 on the heard audio stream 210b to generate a heard transcript 218. In at least one embodiment, the conference program 110a, 110b may implement a multi-source transcription process 220 on the full audio stream 212b to generate a full transcript and recording 222 of the conference call 204. In one embodiment, the multi-source transcription process 220 may receive any chat room conversations 224 and snapshots of graphics 226 associated with the conference call 204 and augment the full transcript and recording 222 with aligned and mapped chat activities and graphical contents. Accordingly, in one embodiment, the full transcript and recording 222 may include one or more common audio content 210a (e.g., from heard audio stream 210b), one or more unheard audio content (e.g., based on identified differences between the heard audio stream 210b and the full audio stream 212b), one or more chat room content (e.g., chatroom conversations 224), and/or one or more graphics content (e.g., snapshots of graphics 226). In one embodiment, the quality of the full transcript may be enhanced by integrating the full transcript (e.g., using machine learning algorithms such as, generative adversarial networks) with the common audio content 210a (e.g., heard content), the full audio stream 212b (e.g., unheard content), and analysis of the chatroom conversations 224.

Figure 3:
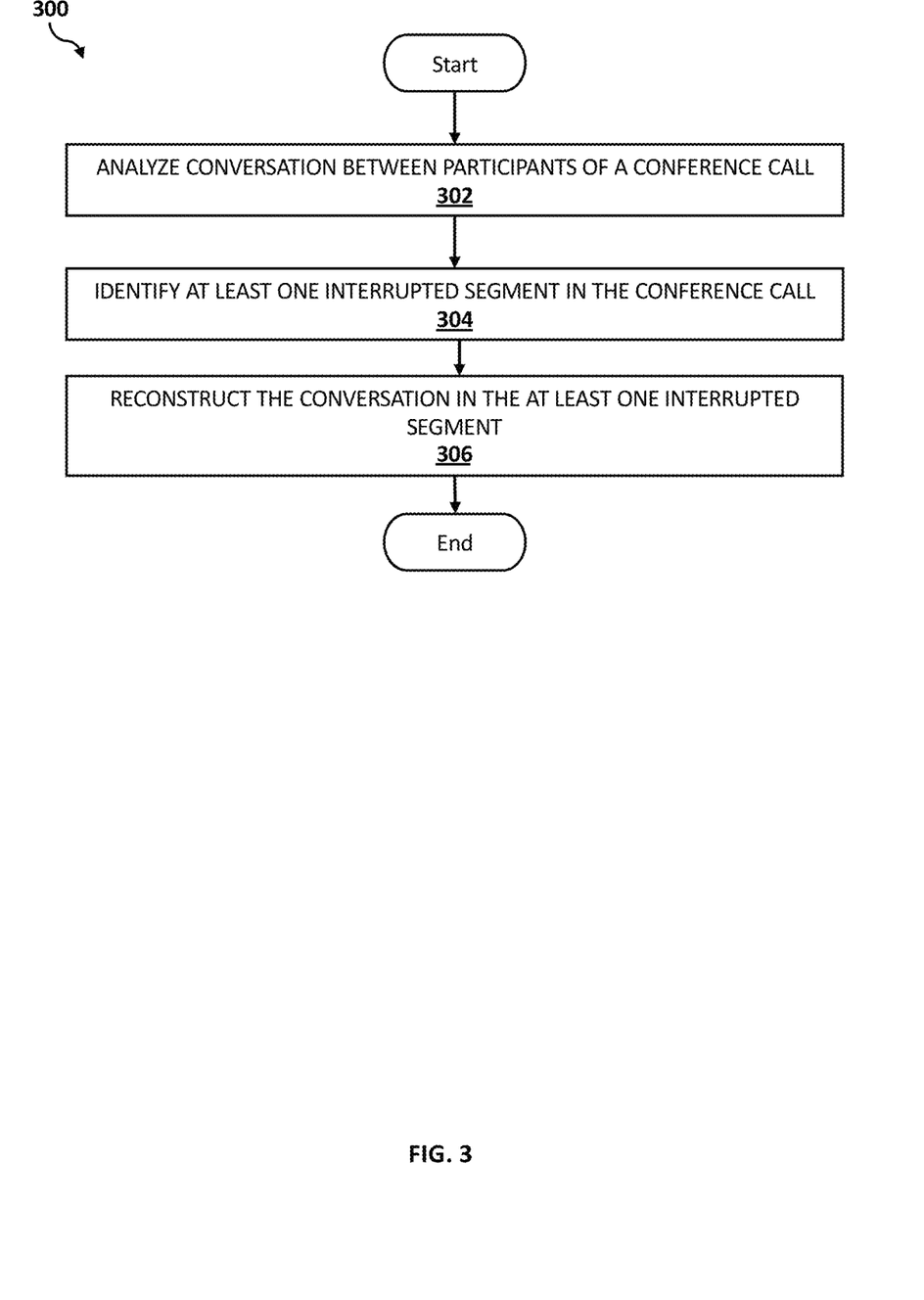
FIG. 3 is an operational flowchart illustrating a conference process according to at least one embodiment.

Referring now to FIG. 3, an operational flowchart illustrating the exemplary conference process 300 used by the conference program 110a,110b according to at least one embodiment is depicted. According to one embodiment, FIG. 3 provides a general description of the conference process 300 which is detailed further with reference to FIG. 4.

At 302, a conversation between participants of a conference call is analyzed. According to one embodiment, the conference program 110a, 110b may record individual audio content from each participant in the conference call. In one embodiment, the conference program 110a, 110b may record the individual audio content on a local device (e.g., data storage device 106) and/or a remote server (e.g., database 114). In one embodiment, the conference program 110a, 110b may time-stamp the individual audio content and associate the individual audio content with the name of the respective participant. In at least one embodiment, the recorded audio from each participant (e.g., individual audio content) may be transmitted to a central server (e.g., server 112). According to one embodiment, the conference program 110a, 110b may store a common audio content (e.g., audio stream as heard in the conference call by the set of participants) locally and/or on the central server.

Then at 304, at least one interrupted segment in the conference call is identified. In one embodiment, the conference program 110a, 110b may compare the heard audio stream (e.g., common audio content) and the full audio stream (e.g., from individual audio content) to determine one or more differences in the audio content. In one embodiment, the conference program 110a, 110b may identify any differences in the audio content as unique contributions from the respective participant which may not have been heard by the full set of participants. In one embodiment, the conference program 110a, 110b may determine that the unheard audio content may have been unheard by the other participants due to an interruption in the conference call. According to one embodiment, the conference program 110a, 110b may implement artificial intelligence (AI) techniques to identify or recognize visually observed signals in the participants that may resemble signals in face-to-face meetings (e.g., participant pausing to collect thoughts or rethink) to aid in the interruption detection process. In some embodiments, the conference program 110a, 110b may also implement AI techniques to identify or recognize environmental noise (e.g., car horn, traffic) to aid in the interruption detection process.

Thereafter at 306, a conversation in the at least one interrupted segment of the conference call is reconstructed. According to one embodiment, the conference program 110a, 110b may generate two types of transcripts. In one embodiment, the conference program 110a, 110b may generate a heard transcript based on the heard audio stream (e.g., common audio content). In another embodiment, the conference program 110a, 110b may also generate a full transcript of the conference call based on the full audio stream.

In one embodiment, the conference program 110a, 110b may divide the conference call into individual segments $S_j$. In one embodiment, individual segments $S_j$ may include segment $S_1, S_2, \ldots, S_M$, where M may indicate any number of individual segments $S_j$ in a full set of segments S (e.g., full length of the call/conversation). According to one embodiment, the conference program 110a, 110b may implement a trained machine learning model to label each segment $S_j$ as "heard" or "unheard" for each participant $P_i$ (FIG. 2).

In at least one embodiment, the conference program 110a, 110b may implement a multi-source transcription process to augment the heard transcript and the full transcript with any chat room conversations and snapshots of graphics (e.g., presentation slides, websites navigated) shared during the conference call. In one embodiment, the conference program 110a, 110b may generate the full transcript of the conference call to include common audio content (e.g., from heard audio stream), unheard audio content (e.g., based on identified differences between the heard audio stream and the full audio stream), one or more chat room content, and/or one or more graphics content. In one embodiment, the conference program 110a, 110b may also generate a full recording of the conference call to include unheard comments from the participants, chat room content, and shared graphics content.

According to one embodiment, the conference program 110a, 110b may implement opt-in audio signal analysis (e.g., from each participant) and video signal analysis (e.g., from each participant) to identity participants in the conference call depicting low engagement levels. In one embodiment, the conference program 110a, 110b may transmit a pop-up message or other notification to the identified participants to encourage them to interact in the conference call (e.g., participant may have been waiting for a chance or too shy to raise questions).

According to one embodiment, the conference program 110a, 110b may provide any unheard segments of the conference call back to the participants during and/or after the conference call. In one embodiment, the conference program 110a, 110b may implement AI techniques to dynamically detect, synthesize, and fill/transcribe any unheard segments of the conference call at each identified segment during the conference call. In another embodiment, the conference program 110a, 110b may generate the full transcript and recording (e.g., including unheard segments) offline after the conference call is completed and send the full transcript and recording to the participants. In one embodiment, the full transcription of the call may be performed once the conference call has ended (e.g., offline transcription) and personalized according to individual participant context as the segment(s) where the interruptions happen may vary from participant to participant. The conference program 110a, 110b may send the specific portion (e.g., unheard) or completely transcribed version of the full recording to each interrupted participant.

According to one embodiment, the conference program 110a, 110b may enable integration between participant calendars and the conference call platform. As such, the conference program 110a, 110b may enable automatically notifying the conference call (e.g., a current speaker and/or host of the conference call) to prioritize a speaking segment by a participant if a calendar entry of the participant indicates a partial scheduling conflict between the current conference call and another meeting such that the participant may have to attend another meeting soon. The calendar integration may enable the flow of a conference call to be maintained without the participant needing to interrupt the conference call to notify the other participants of the participant's upcoming meetings. This may also help the conference call to remain focused and wrap up any agendas related to the participant that may need to drop out of the conference call soon.

Figure 4:
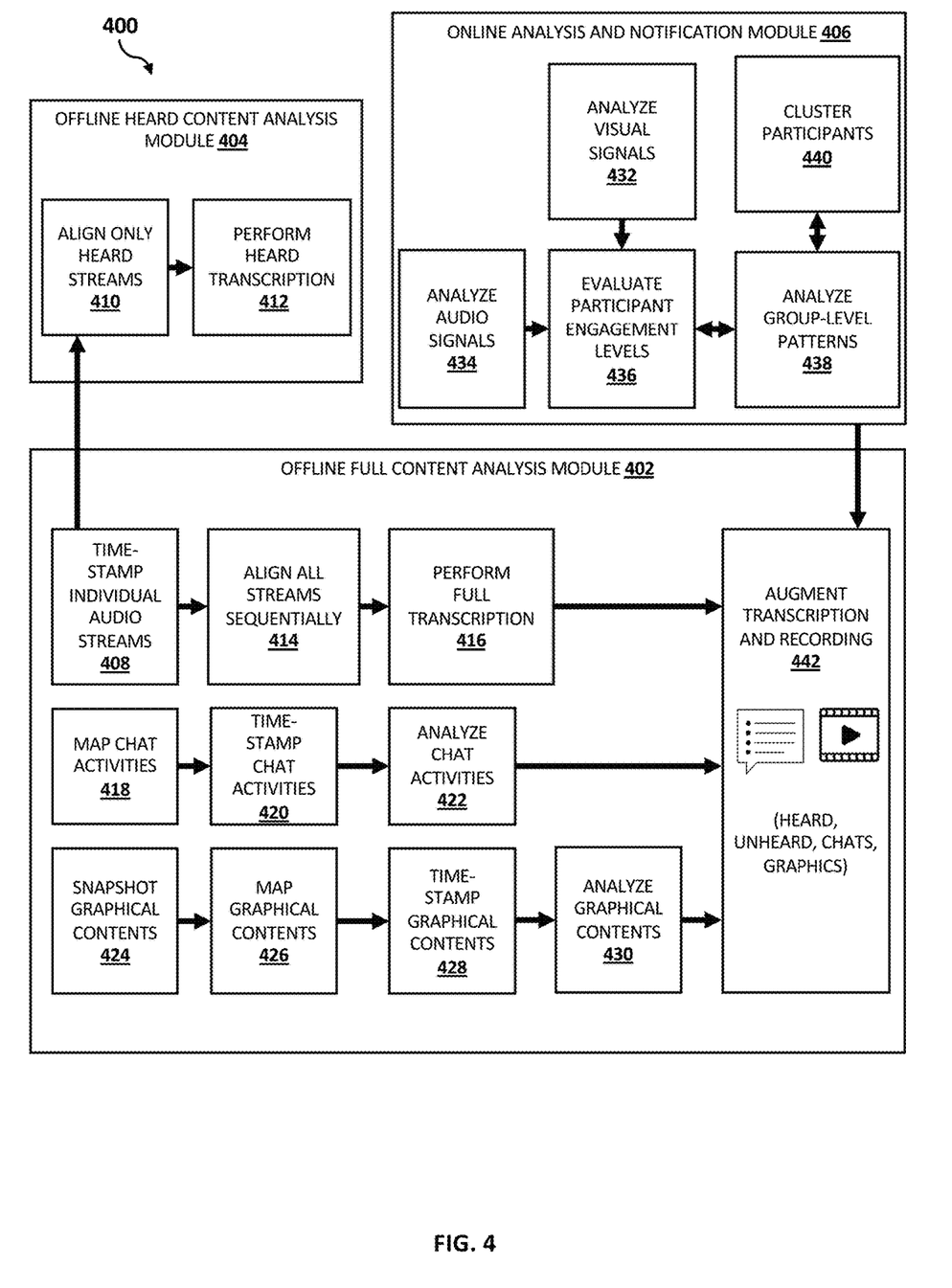
FIG. 4 is a schematic block diagram of a system architecture implementing the conference process according to at least one embodiment.

Referring now to FIG. 4, a schematic block diagram of a system architecture 400 of the conference program 110a, 110b implementing the conference process 300 according to at least one embodiment is depicted.

According to one embodiment, system architecture 400 may generally include three modules: an offline full content analysis module 402, an offline heard content analysis module 404, and an online analysis and notification module 406. In one embodiment, the conference program 110a, 110b may implement the online analysis and notification module 406 in real-time over the duration of conference call. In at least one embodiment, the conference program 110a, 110b may implement the offline heard content analysis module 404 and the offline full content analysis module 402 concurrently. In various embodiments, various portions of the heard content analysis and full content analysis may be performed online in real-time over the duration of conference call.

According to one embodiment, at 408, the conference program 110a, 110b may time-stamp individual audio streams. In one embodiment, the conference program 110a, 110b may receive recorded audio streams from each participant and add time-stamps for the start and end instances of each speech segment.

According to one embodiment, at 410, the conference program 110a, 110b may align only heard streams. In one embodiment, the conference program 110a, 110b may analyze the time-stamp of individual audio streams and arrange all of the heard segments of the conference call sequentially.

According to one embodiment, at 412, the conference program 110a, 110b may perform heard transcription. In one embodiment, the conference program 110a, 110b may implement machine learning techniques that provides speech-to-text translation to transcribe the aligned audio streams of only heard segments from the conference call.

According to one embodiment, at 414, the conference program 110a, 110b may align all streams sequentially. In one embodiment, the conference program 110a, 110b may align the individual audio streams from all of the participants, whether or not they are heard by all the participants. Thus, this alignment process may result in a full transcription that is a longer sequence compared to the alignment process on the heard streams. Then, at 416, the conference program 110a, 110b may perform full transcription. In one embodiment, the conference program 110a, 110b may implement machine learning techniques that provides speech-to-text translation to transcribe the aligned audio streams of all segments from the conference call.

According to one embodiment, at 418, the conference program 110a, 110b may map chat activities. In one embodiment, the conference program 110a, 110b may analyze the chat room content and map the question and answer interactions to their corresponding participants. Then, at 420, the conference program 110a, 110b may time-stamp the chat activities. In one embodiment, the conference program 110a, 110b may time-stamp chat activities by the participants to index the start and end instances of each chat activity. Thereafter, at 422, the conference program 110a, 110b may analyze chat activities. In one embodiment, the conference program 110a, 110b may employ natural language processing techniques to analyze the contents of the chat activities.

According to one embodiment, at 424, the conference program 110a, 110b may snapshot graphical contents. In one embodiment, the conference program 110a, 110b may detect graphical contents being shared in the conference call (e.g., presentation slides or visited websites) and capture snapshots of the graphical contents. Then, at 426, the conference program 110a, 110b may map the graphical contents. In one embodiment, the conference program 110a, 110b may map the graphical contents to the participant who shared the content during the conference call. Thereafter, at 428, the conference program 110a, 110b time-stamp the graphical contents. In one embodiment, similarly to the audio and chat activities, the conference program 110a, 110b may time-stamp the snapshots of the graphical contents from each participant. Next, at 430, the conference program 110a, 110b may analyze the graphical contents. In one embodiment, the conference program 110a, 110b may implement optical character recognition techniques to analyze the graphical contents. As a result, the conference program 110a, 110b may generate texts from the snapshots of the graphical contents. In at least one embodiment, the conference program 110a, 110b may employ image caption algorithms to textually describe the graphical contents.

According to one embodiment, at 432, the conference program 110a, 110b may analyze visual signals. In one embodiment, the conference program 110a, 110b may include an opt-in facial signal analysis configured to evaluate the emotions of a participant. In one embodiment, if the participant decides to opt-in, the conference program 110a, 110b may perform the facial signal analysis in real-time during the conference call.

According to one embodiment, at 434, the conference program 110a, 110b may analyze audio signals. In one embodiment, the conference program 110a, 110b may include an opt-in audio signal analysis configured to infer the speaking patterns of each participant based on evaluating the online processing of the audio streams from each participant. In one embodiment, if the participant decides to opt-in, the conference program 110a, 110b may perform the audio signal analysis in real-time during the conference call.

According to one embodiment, at 436, the conference program 110a, 110b may evaluate participant engagement levels. In one embodiment, the conference program 110a, 110b may analyze the audio-video signals coming from each participant (e.g., that has opted-in) to compute the level of engagement by those participants. In one embodiment, if the conference program 110a, 110b identifies participants depicting low engagement levels, the conference program 110a, 110b may transmit a message to those participants to encourage them to participate.

According to one embodiment, at 438, the conference program 110a, 110b may analyze group-level patterns. In one embodiment, the conference program 110a, 110b may analyze the audio-video streams and engagement levels of the participants to understand the group-level pattern of the conference call. For example, the conference program 110a, 110b may use this information to identify whether a particular participant has stopped speaking, pausing, or thinking of what they are going to say. In another example, the conference program 110a, 110b may use this information to differentiate whether a participant with low engagement level is actively listening or waiting for a chance to participate or ask questions.

According to one embodiment, at 440, the conference program 110a, 110b may cluster the participants. In one embodiment, the conference program 110a, 110b may cluster the participants to provide more semantically coherent transcriptions of the conference call based on distinctive agendas (e.g., topics discussed during the conference call).

According to one embodiment, at 442, the conference program 110a, 110b may augment the transcription and recording of the conference call. In one embodiment, the conference program 110a, 110b may augment the full transcription (process 408-416) with more information extracted from analyzing of the chat activities (process 418-422) and the snapshots of the graphical contents (process 424-430). In one embodiment, the conference program 110a, 110b may also augment the recording of the conference call with unheard audio streams from participants and with chat room activities (e.g., generate audio stream of chat room content). In at least one embodiment, the augment transcription and recording process at 442 may implement data from the online analysis and notification module 406 to improve the full transcription and recording of the conference call (e.g., participant clusters to provide more semantically coherent transcriptions of the meeting).

Accordingly, the conference program 110a, 110b may improve the functionality of a computer because the conference program 110a, 110b may enable a computer to analyze an on-going and/or past conference call to identify/detect/predict interrupted segments in the call. The conference program 110a, 110b may also improve the functionality of the computer by enabling the computer to reconstruct the full contents of the call by utilizing both heard and unheard audio streams from all the participants, chat room content, and graphical content shared during the call.

It may be appreciated that FIGS. 2 to 4 provide only an illustration of one embodiment and do not imply any limitations with regard to how different embodiments may be implemented. Many modifications to the depicted embodiment(s) may be made based on design and implementation requirements.

Figure 5:
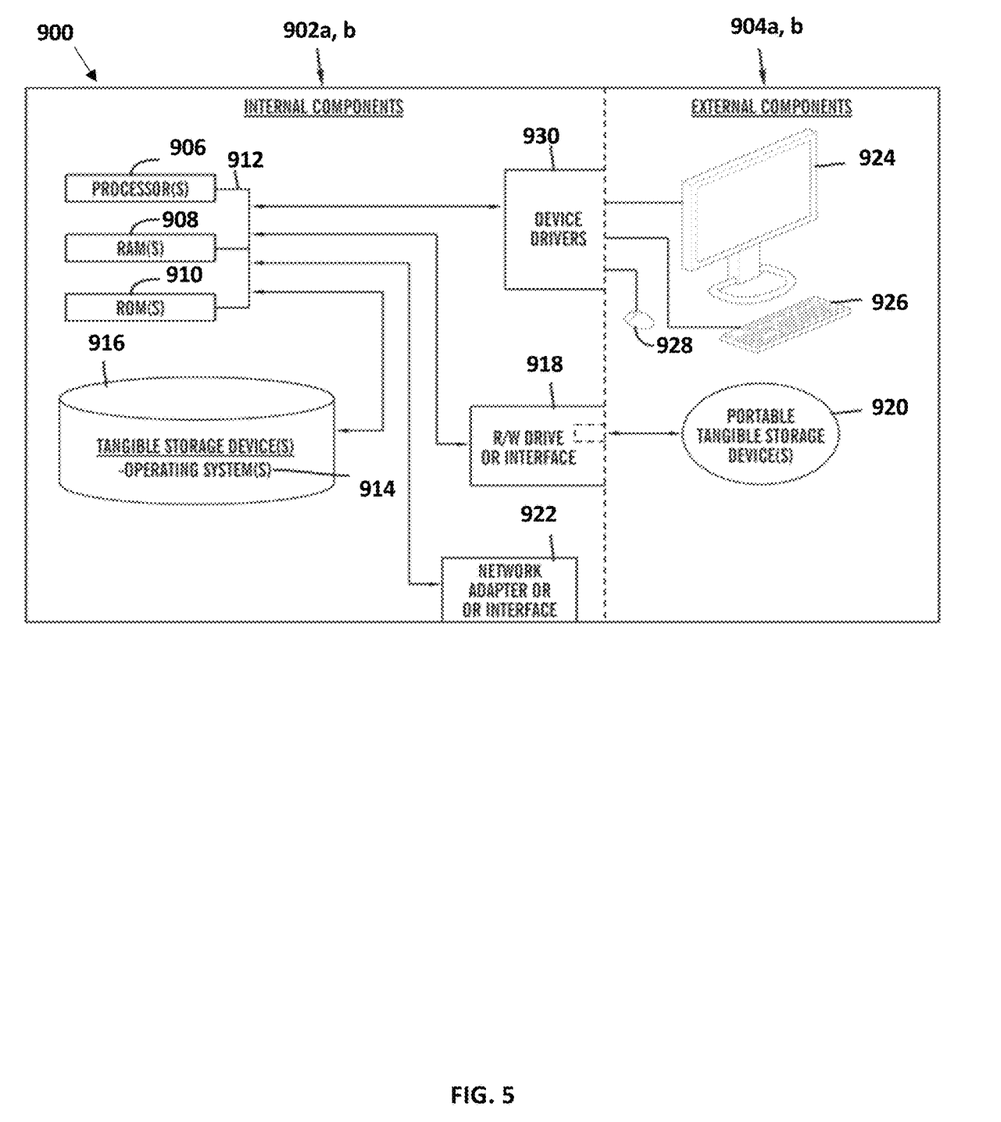
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the conference program 110a in client computer 102, and the conference program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the conference program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the conference program 110a in client computer 102 and the conference program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the conference program 110a in client computer 102 and the conference program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
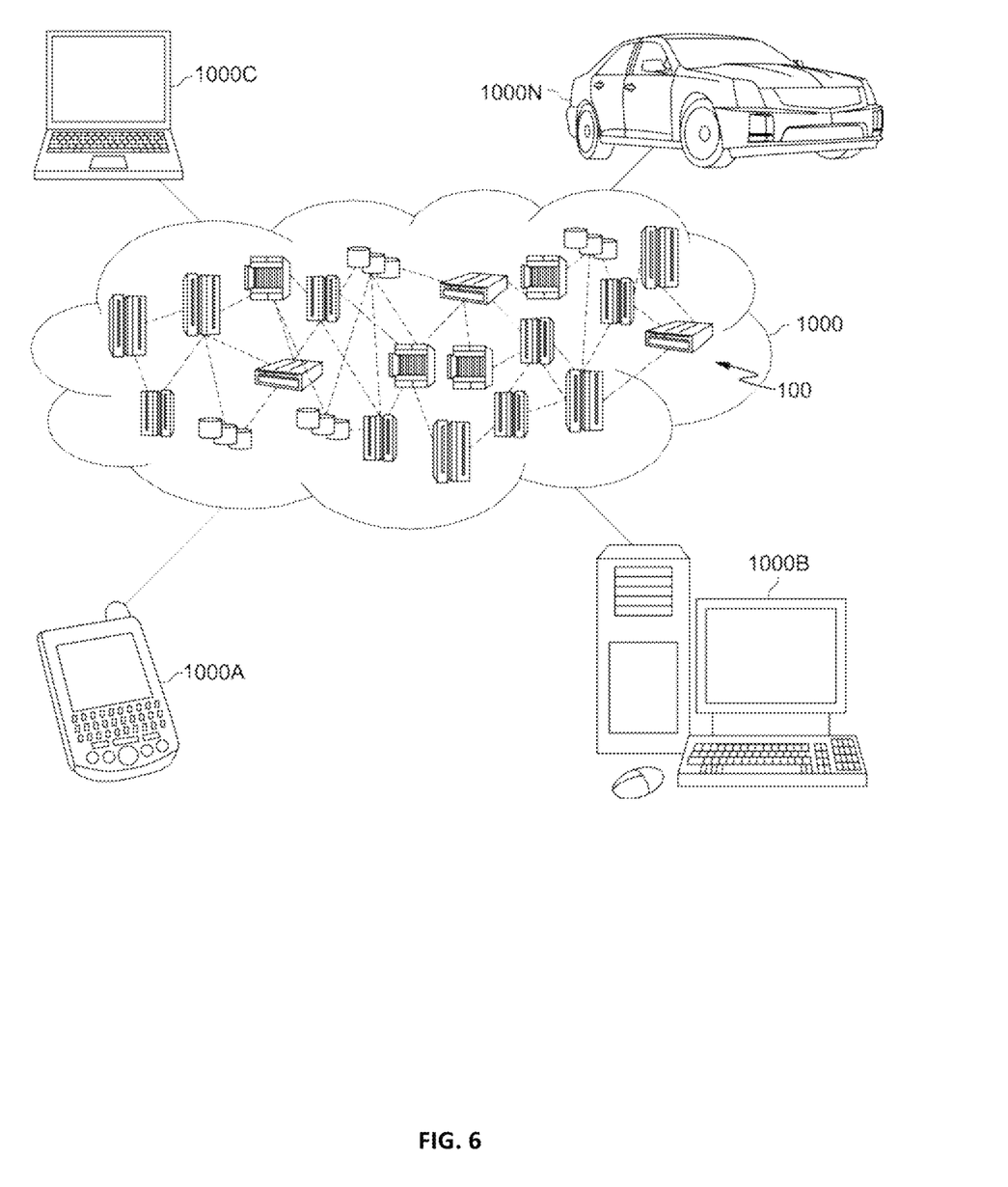
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
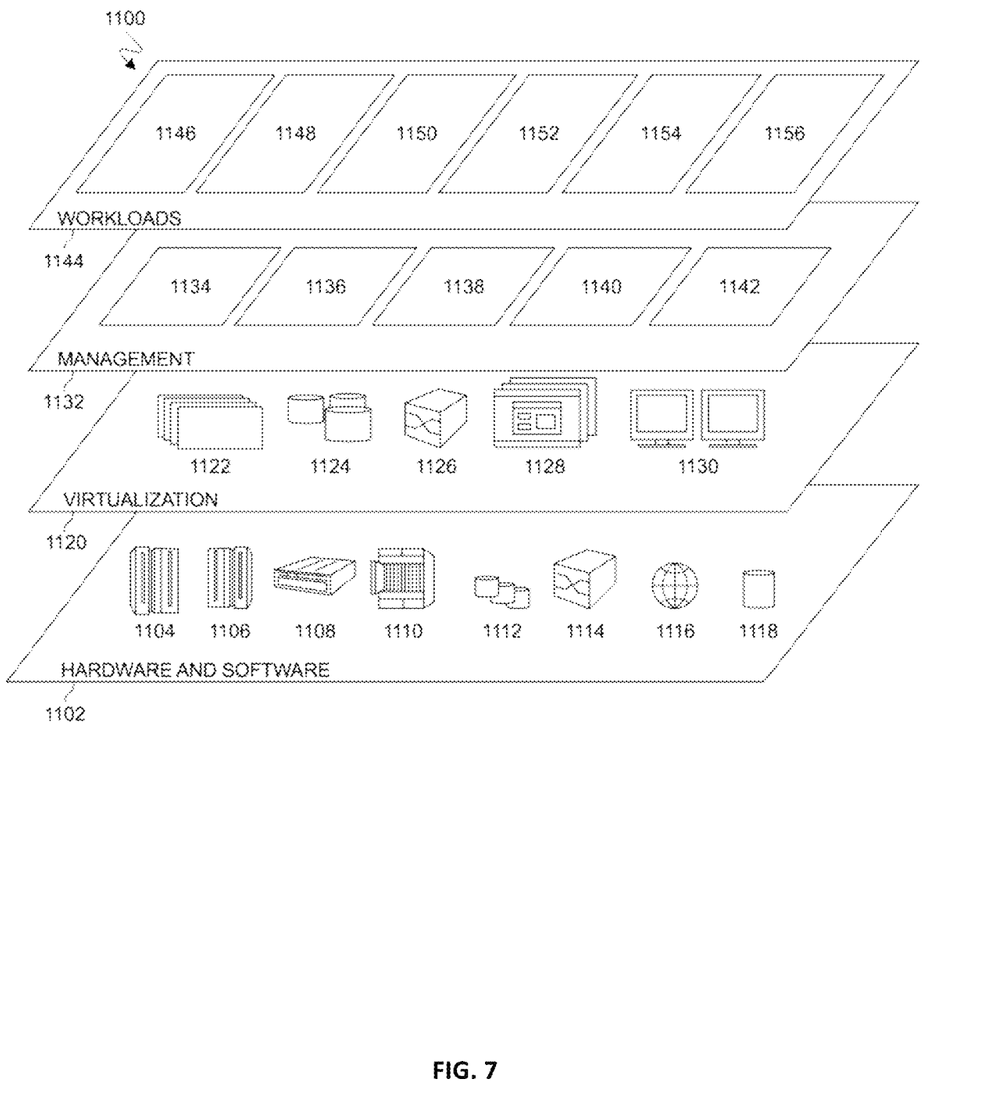
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and conference processing 1156. A conference program 110a, 110b provides a way to preserve the content and intent of conversations between two or more participants when they speak at the same time in an audio and/or video-based conference call and reconstruct any interrupted (e.g., unheard) segment of the conference call for each interrupted participant.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
analyzing a conference call including at least two participants;
identifying at least one interrupted segment in the analyzed conference call based on performing a comparison among a plurality of audio streams to identify at least one unheard audio content in at least one audio stream of the plurality of audio streams, wherein the at least one unheard audio content is included in another audio stream of the plurality of audio streams but is not included in the at least one audio stream of the plurality of audio streams due to an interruption from a louder audio input; and
reconstructing the identified at least one interrupted segment of the analyzed conference call to include the at least one unheard audio content.

2. The method of claim 1, further comprising:
generating a heard audio stream based on at least one common audio content heard during the analyzed conference call;
generating a full audio stream based on at least one individual audio content recorded from a respective participant of the at least two participants;
comparing the generated heard audio stream and the generated full audio stream; and
in response to identifying a difference between the generated heard audio stream and the generated full audio stream, determining the identified difference to include the at least one unheard audio content from the identified at least one interrupted segment of the analyzed conference call.

3. The method of claim 1, further comprising:
generating a full audio stream based on at least one individual audio content recorded from a respective participant of the at least two participants;
generating a full transcript based on the generated full audio stream; and
labeling, using a trained machine learning model, each segment of the generated full transcript for each participant of the at least two participants, wherein each labeled segment is selected from the group consisting of a heard segment of the analyzed conference call and an unheard segment of the analyzed conference call.

4. The method of claim 1, wherein identifying the at least one interrupted segment in the analyzed conference call further comprises recognizing at least one visually observed signal from a participant resembling a face-to-face meeting.

5. The method of claim 1, further comprising:
generating a full audio stream based on at least one individual audio content recorded from a respective participant of the at least two participants;
generating a full transcript based on the generated full audio stream;
in response to identifying at least one chatroom content associated with the analyzed conference call, augmenting the generated full transcript to include the identified at least one chat room content; and
in response to identifying at least one graphical content shared in the analyzed conference call, augmenting the generated full transcript to include the identified at least one graphical content.

6. The method of claim 1, further comprising:
generating a full audio stream based on at least one individual audio content recorded from a respective participant of the at least two participants;
generating a full recording of the analyzed conference call based on the generated full audio stream;
augmenting the generated full recording to include the at least one unheard audio content from the identified at least one interrupted segment of the analyzed conference call; and
in response to identifying at least one chat room content associated with the analyzed conference call, augmenting the generated full recording to include an audio stream of the identified at least one chat room content.

7. The method of claim 1, further comprising:
integrating a calendar with the analyzed conference call; and
in response to identifying a calendar entry of a participant indicating a partial scheduling conflict between the analyzed conference call and another meeting, automatically transmitting a notification to the analyzed conference call to prioritize a speaking segment by the participant before the another meeting.

8. The method of claim 1, further comprising:
generating a full transcript of the analyzed conference call;
augmenting, using a machine learning algorithm, the generated full transcript to include at least one heard segment of the analyzed conference call, at least one unheard segment of the analyzed conference call, and an analysis of at least one chatroom content associated with the analyzed conference call to enhance a quality of the generated full transcript.

9. A computer system for interpreting conference call interruptions, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
analyzing a conference call including at least two participants;
identifying at least one interrupted segment in the analyzed conference call based on performing a comparison among a plurality of audio streams to identify at least one unheard audio content in at least one audio stream of the plurality of audio streams, wherein the at least one unheard audio content is included in another audio stream of the plurality of audio streams but is not included in the at least one audio stream of the plurality of audio streams due to an interruption from a louder audio input; and
reconstructing the identified at least one interrupted segment of the analyzed conference call to include the at least one unheard audio content.

10. The computer system of claim 9, further comprising:
generating a heard audio stream based on at least one common audio content heard during the analyzed conference call;
generating a full audio stream based on at least one individual audio content recorded from a respective participant of the at least two participants;
comparing the generated heard audio stream and the generated full audio stream; and
in response to identifying a difference between the generated heard audio stream and the generated full audio stream, determining the identified difference to include the at least one unheard audio content from the identified at least one interrupted segment of the analyzed conference call.

11. The computer system of claim 9, further comprising:
generating a full audio stream based on at least one individual audio content recorded from a respective participant of the at least two participants;
generating a full transcript based on the generated full audio stream; and
labeling, using a trained machine learning model, each segment of the generated full transcript for each participant of the at least two participants, wherein each labeled segment is selected from the group consisting of a heard segment of the analyzed conference call and an unheard segment of the analyzed conference call.

12. The computer system of claim 9, wherein identifying the at least one interrupted segment in the analyzed conference call further comprises recognizing at least one visually observed signal from a participant resembling a face-to-face meeting.

13. The computer system of claim 9, further comprising:
generating a full audio stream based on at least one individual audio content recorded from a respective participant of the at least two participants;
generating a full transcript based on the generated full audio stream;
in response to identifying at least one chat room content associated with the analyzed conference call, augmenting the generated full transcript to include the identified at least one chat room content; and
in response to identifying at least one graphical content shared in the analyzed conference call, augmenting the generated full transcript to include the identified at least one graphical content.

14. The computer system of claim 9, further comprising:
generating a full audio stream based on at least one individual audio content recorded from a respective participant of the at least two participants;
generating a full recording of the analyzed conference call based on the generated full audio stream;
augmenting the generated full recording to include the at least one unheard audio content from the identified at least one interrupted segment of the analyzed conference call; and
in response to identifying at least one chat room content associated with the analyzed conference call, augmenting the generated full recording to include an audio stream of the identified at least one chat room content.

15. The computer system of claim 9, further comprising:
integrating a calendar with the analyzed conference call; and
in response to identifying a calendar entry of a participant indicating a partial scheduling conflict between the analyzed conference call and another meeting, automatically transmitting a notification to the analyzed conference call to prioritize a speaking segment by the participant before the another meeting.

16. The computer system of claim 9, further comprising:
generating a full transcript of the analyzed conference call;
augmenting, using a machine learning algorithm, the generated full transcript to include at least one heard segment of the analyzed conference call, at least one unheard segment of the analyzed conference call, and an analysis of at least one chatroom content associated with the analyzed conference call to enhance a quality of the generated full transcript.

17. A computer program product for interpreting conference call interruptions, comprising:
one or more computer-readable storage media and program instructions collectively stored on the one or more computer-readable storage media, the program instructions executable by a processor to cause the processor to perform a method comprising:
analyzing a conference call including at least two participants;
identifying at least one interrupted segment in the analyzed conference call based on performing a comparison among a plurality of audio streams to identify at least one unheard audio content in at least one audio stream of the plurality of audio streams, wherein the at least one unheard audio content is included in another audio stream of the plurality of audio streams but is not included in the at least one audio stream of the plurality of audio streams due to an interruption from a louder audio input; and reconstructing the identified at least one interrupted segment of the analyzed conference call to include the at least one unheard audio content.

18. The computer program product of claim 17, further comprising:

generating a heard audio stream based on at least one common audio content heard during the analyzed conference call;

generating a full audio stream based on at least one individual audio content recorded from a respective participant of the at least two participants;

comparing the generated heard audio stream and the generated full audio stream; and in response to identifying a difference between the generated heard audio stream and the generated full audio stream, determining the identified difference to include the at least one unheard audio content from the identified at least one interrupted segment of the analyzed conference call.

19. The computer program product of claim 17, further comprising:

generating a full audio stream based on at least one individual audio content recorded from a respective participant of the at least two participants;

generating a full transcript based on the generated full audio stream; and labeling, using a trained machine learning model, each segment of the generated full transcript for each participant of the at least two participants, wherein each labeled segment is selected from the group consisting of a heard segment of the analyzed conference call and an unheard segment of the analyzed conference call.

20. The computer program product of claim 17, wherein identifying the at least one interrupted segment in the analyzed conference call further comprises recognizing at least one visually observed signal from a participant resembling a face-to-face meeting.

\* \* \* \* \*